United States Patent
Yoo et al.

(10) Patent No.: US 12,555,788 B2
(45) Date of Patent: Feb. 17, 2026

(54) MANUFACTURING METHOD OF ANODE ACTIVE MATERIAL AND SECONDARY BATTERY COMPRISING THE SAME

(71) Applicant: FIC ADVANCED MATERIALS, INC., Pohang-si (KR)

(72) Inventors: Sung Woon Yoo, Seoul (KR); Hyun Ho Lee, Hwaseong-si (KR); Byung Gwan Lee, Hwaseong-si (KR)

(73) Assignee: FIC ADVANCED MATERIALS, INC., Pohang-si (KR)

( * ) Notice: Subject to any disclaimer, the term of this patent is extended or adjusted under 35 U.S.C. 154(b) by 507 days.

(21) Appl. No.: 18/006,524

(22) PCT Filed: Jul. 9, 2021

(86) PCT No.: PCT/KR2021/008770
§ 371 (c)(1),
(2) Date: Jan. 23, 2023

(87) PCT Pub. No.: WO2022/019544
PCT Pub. Date: Jan. 27, 2022

(65) Prior Publication Data
US 2023/0275225 A1    Aug. 31, 2023

(30) Foreign Application Priority Data
Jul. 24, 2020  (KR) .................. 10-2020-0092098

(51) Int. Cl.
| | |
|---|---|
| *H01M 4/583* | (2010.01) |
| *H01M 4/36* | (2006.01) |
| *H01M 4/485* | (2010.01) |
| *H01M 4/62* | (2006.01) |

(Continued)

(52) U.S. Cl.
CPC .......... *H01M 4/583* (2013.01); *H01M 4/366* (2013.01); *H01M 4/485* (2013.01); *H01M 4/625* (2013.01); *H01M 50/46* (2021.01); *H01M 2004/027* (2013.01)

(58) Field of Classification Search
None
See application file for complete search history.

(56) References Cited

U.S. PATENT DOCUMENTS

| | | |
|---|---|---|
| 9,077,044 B2 | 7/2015 | Yoon et al. |
| 2019/0334173 A1 | 10/2019 | Ikado et al. |

FOREIGN PATENT DOCUMENTS

| | | |
|---|---|---|
| CN | 106784640 B | 5/2020 |
| JP | 2014-165018 A | 9/2014 |
| JP | 6251968 B2 | 12/2017 |

(Continued)

*Primary Examiner* — Carlos Barcena
(74) *Attorney, Agent, or Firm* — NKL LAW; Jae Youn Kim

(57) ABSTRACT

The present invention relates to a method for preparing an anode active material and a secondary battery including the anode active material. The anode active material may be prepared by a method including the steps of: obtaining byproduct particles that have not been spheroidized in a step of pulverizing and spheroidizing flaky graphite particles; preparing coated particles by mixing the graphite byproduct particles with composite particles and performing a mechanochemical reaction thereon to coat the surface of the graphite byproduct particles with the composite particles; and spheroidizing the coated particles and coating the surface thereof with amorphous carbon to prepare spherical graphite.

2 Claims, 2 Drawing Sheets

(51) Int. Cl.
*H01M 50/46* (2021.01)
*H01M 4/02* (2006.01)

(56) References Cited

FOREIGN PATENT DOCUMENTS

| | | |
|---|---|---|
| KR | 10-0274233 B1 | 2/2001 |
| KR | 10-2009-0109225 A | 10/2009 |
| KR | 10-2013-0016727 A | 2/2013 |
| KR | 10-2013-0107892 A | 10/2013 |
| KR | 1020160030276 A | 3/2016 |
| KR | 1020160057255 A | 5/2016 |
| KR | 10-2018-0094747 A | 8/2018 |
| KR | 10-1919470 B1 | 8/2018 |
| KR | 10-2019-0007245 A | 1/2019 |
| KR | 10-1965773 B1 | 4/2019 |
| KR | 10-1986680 B1 | 6/2019 |
| KR | 10-2019-0101179 A | 8/2019 |
| KR | 10-2081397 B1 | 2/2020 |
| WO | 2017/099456 A1 | 6/2017 |

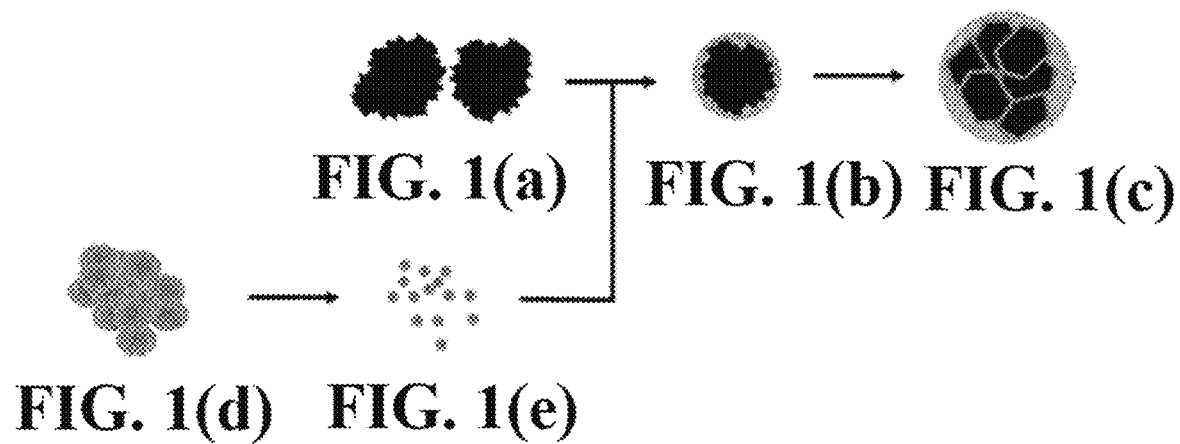
FIG. 1(a) FIG. 1(b) FIG. 1(c)
FIG. 1(d) FIG. 1(e)
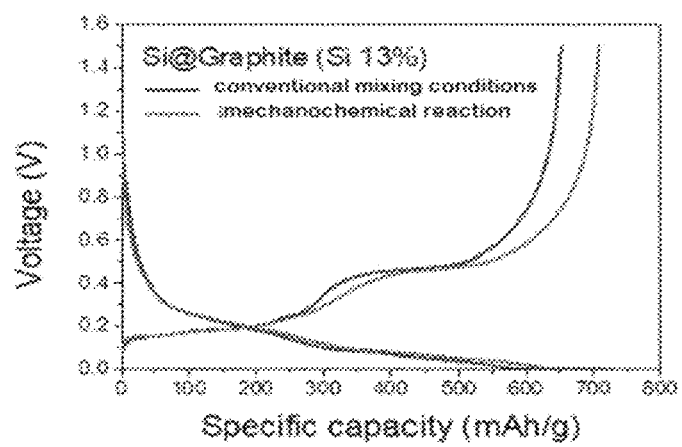
FIG. 2(a)
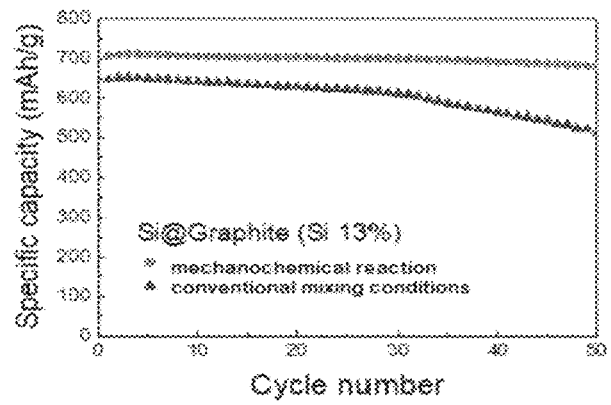
FIG. 2(b)

MANUFACTURING METHOD OF ANODE ACTIVE MATERIAL AND SECONDARY BATTERY COMPRISING THE SAME

TECHNICAL FIELD

The present invention relates to a method for preparing an anode active material and a secondary battery including the anode active material, and more specifically, to an anode active material including spherical graphite particles coated with amorphous carbon prepared by a mechanochemical reaction, a method for preparing the anode active material and a secondary battery including the anode active material.

BACKGROUND ART

Crystalline graphite, which is used as an anode active material for a lithium secondary battery, is obtained and used by preparing flaky graphite in spherical graphite particles through a granulating process. Since these spherical graphite particles are granulated without a gap between flaky graphite fragments on the surface of the particles, there is a limitation in contact with an electrolyte. Due to this, when applying these particles to the anode active material, there is a problem in that charge/discharge characteristics of the battery are reduced. This is because expansion and contraction of spherical graphite particles cannot be effectively controlled during charging and discharging processes in which lithium ions are repeatedly intercalated and deintercalated. Eventually, structures of the granulated particles become unstable as a bonding force of the flaky graphite fragments is decreased, and a reaction with the electrolyte penetrating into the particles is performed in an irreversible reaction due to repeated charging and discharging, such that an excessive solid-electrolyte interphase film is formed and a swelling phenomenon occurs.

In order to solve these problems, research and development to improve properties of spherical graphite particles have been conducted.

For example, in Korean Patent Registration Nos. 10-1965773 and 10-1919470, by applying a technique in which spheroidized natural graphite particles are subjected to ultrasonic treatment to expand gaps between the flaky natural graphite fragment particles present on the surface and inside of the spheroidized natural graphite particles, and defects of a concave-convex structure are formed on the surface of the flaky natural graphite fragment particles present on the surface and inside of the spheroidized natural graphite particles, high-rate charge/discharge characteristics and cycle life-span characteristics of the secondary battery are improved.

In addition, in Korean Patent Registration Publication No. 10-1986680, by isotropically pressing granulated particles including crystalline natural graphite powder particles and soft carbon precursor, properties of the prepared particles are improved.

When applying the conventional preparation method known in the prior art, it is possible to form gaps between the spherical particles, such that the properties of the particles as an anode active material may be improved. However, it is not possible to completely solve the problem in that the process is complicated and the bonding force of the flaky graphite fragments is reduced, such that improvement thereof is required.

SUMMARY OF INVENTION

Problems to be Solved by Invention

In consideration of the above-mentioned circumstances, it is an object of the present invention to provide a method for preparing an anode active material capable of improving high-rate charge/discharge characteristics and cycle life-span characteristics of the secondary battery by preparing spherical graphite particles through a mechanochemical reaction thus to form gaps between flaky graphite particles while improving stability thereof.

In particular, another object of the present invention is to provide a method for preparing an anode active material through a mechanochemical reaction by utilizing a large amount of graphite byproduct particles obtained in a process of pulverizing flaky graphite.

Further, another object of the present invention is to provide a secondary battery with improved charge/discharge characteristics by using the anode active material as an anode material.

Means for Solving Problems

To achieve the above objects, according to an aspect of the present invention, there is provided a method for preparing an anode active material including the steps of: obtaining graphite byproduct particles that have not been spheroidized in a step of pulverizing and spheroidizing flaky graphite particles; preparing coated particles by mixing the graphite byproduct particles with composite particles and performing a mechanochemical reaction thereon to coat the surface of the graphite byproduct particles with the composite particles; and spheroidizing the coated particles and coating the surface thereof with amorphous carbon to prepare spherical graphite.

At this time, the composite particles may include any one of silicon (Si), tin (Sn), antimony (Sb), aluminum (Al), germanium (Ge), zinc (Zn), lead (Pb), or a mixture of two or more thereof, or an oxide thereof, or a mixture of two or more of the oxides.

In addition, according to another aspect of the present invention, there is provided a secondary battery including: an anode including the anode active material prepared by the above preparation method; a cathode disposed to face the anode and including a cathode active material; a separator provided between the cathode and the anode; and an electrolyte provided to impregnate the separator.

Advantageous Effects

According to the method for preparing an anode active material of the present invention, there are effects as follows. First, it is possible to improve high-rate charge/discharge characteristics and cycle life-span characteristics of the secondary battery by preparing spherical graphite particles through a mechanochemical reaction thus to form gaps between flaky graphite particles while improving stability thereof.

In particular, it is possible to prepare an anode active material by utilizing a large amount of graphite byproduct particles obtained in a process of pulverizing flaky graphite.

Further, it is possible to improve charge/discharge characteristics of the secondary battery by using the anode active material as an anode material.

BRIEF DESCRIPTION OF DRAWINGS

FIGS. 1(a)-1(e) are views showing a concept of a process for preparing an anode active material according to the present invention.

FIGS. 2a and 2(b) are graphs showing test evaluation results for capacity (a) and cycle characteristics (b) of secondary batteries to which graphite including silicon deposited on a surface thereof by a conventional method and graphite including silicon bonded thereto by a mechanochemical reaction of the present invention are applied.

MODE FOR CARRYING OUT INVENTION

Figure 3A:
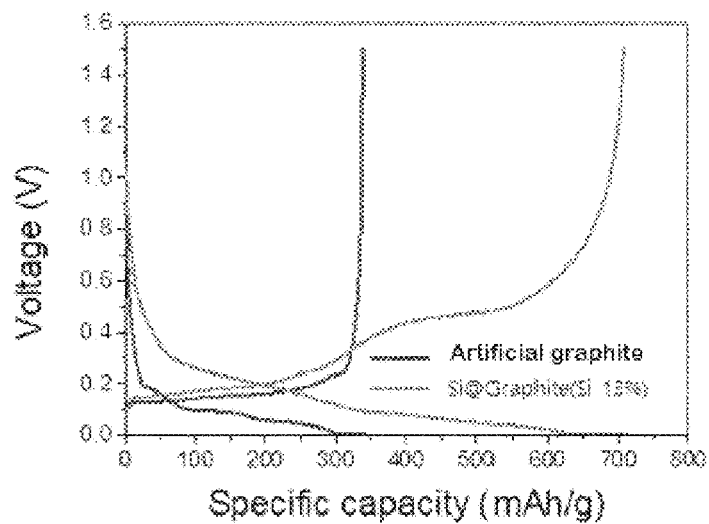
FIGS. 3(a) and 3(b) are graphs showing test evaluation results for capacity (a) and cycle characteristics (b) of secondary batteries to which artificial graphite and spherical graphite of the present invention are applied.

Hereinafter, the present invention will be described in detail. Prior to this, terms or words used in the specification and claims should not be construed as limited to a conventional or lexical meaning. Instead, based on a principle that an inventor may desirably define the concept of terms or words to describe his/her invention by means of the most preferable method, the terms or words should be construed as the meanings and concepts in compliance with technical ideas of the present invention.

The anode active material according to the present invention uses spherical graphite particles as a main material, and is technically characterized in that the characteristics of the anode active material are improved by optimizing a process for preparing spherical graphite particles.

In general, flaky graphite particles have a particle size of 30 to 200 and when spheroidizing the particles by pulverizing, a yield thereof is only about 40%, and the remaining 60% remains as a graphite byproduct. That is, there is a problem in that only particles with abraded edges of the flaky graphite particles can be spheroidized, and the byproducts with sharp edges should be discarded since they are graphite fragments.

Another technical characteristic of the present invention is to provide an improved process capable of utilizing the graphite byproduct particles in addition to a process for optimizing the preparation process of the spherical graphite particles.

To this end, the anode active material according to the present invention may be prepared by a method including the steps of: obtaining graphite byproduct particles that have not been spheroidized in a step of pulverizing and spheroidizing flaky graphite particles; preparing coated particles by mixing the graphite byproduct particles with composite particles and performing a mechanochemical reaction thereon to coat the surface of the graphite byproduct particles with the composite particles; and spheroidizing the coated particles and coating the surface thereof with amorphous carbon to prepare spherical graphite.

In general, when preparing spherical graphite by a dry preparation process, flaky graphite particles may be spheroidized by pulverizing through high-speed milling. In this case, since the spheroidization is performed as the graphite particles collide during the high-speed milling process, the yield thereof is only about 40%, and there is a problem in that all graphite byproduct particles that have not been spheroidized should be discarded. For example, when pulverizing and spheroidizing flaky graphite particles with a size of 30 to 200 μm by high-speed milling, spherical graphite of 3 to 20 μm are formed. Then, an anode active material is prepared by performing a surface treatment to remove a rough surface by milling the spherical graphite at a low speed, and coating the surface thereof with amorphous carbon. In this regard, there are problems in that the yield of the spherical graphite particles prepared by the above-described process is too low, and gaps between the obtained spherical graphite particles are insufficient, thereby resulting in a decrease in the charge/discharge characteristics of the battery.

Furthermore, recycling the graphite byproduct particles that have not been spheroidized causes more difficult problems in relation to the process, and even if preparing spherical graphite particles using the same, there is a very high possibility that the prepared products will be defective due to insufficient charge/discharge characteristics.

In the present invention, the problems entailed in the conventional preparation method are solved through a preparation method capable of processing the graphite byproduct particles into spherical graphite particles using a mechanochemical reaction. In the mechanochemical reaction, compression, shear and impact between particles can occur at once, such that chemical bonds between the particles are created by a mechanical energy.

Herein, a method for preparing an anode active material according to the present invention will be described with reference to FIGS. 1(a)-1(e). The anode active material may be prepared through the processes of: obtaining graphite byproduct particles generated in a step of preparing spheroidized particles by pulverizing and spheroidizing flaky graphite particles (FIG. 1(a)); preparing coated particles by mixing composite particles with the graphite byproduct particles and performing a mechanochemical reaction to coat the composite particles (FIG. 1(b)); and preparing spherical graphite by spheroidizing the coated particles and coating a surface thereof with amorphous carbon (FIG. 1(c)).

The graphite byproduct particles are byproducts remaining after the spheroidization process and have a size of 3 to 6 μm. The graphite byproduct particles may include byproducts of natural graphite, kish graphite, or artificial graphite.

The composite particles for mixing with the graphite byproduct particles may include any one of silicon (Si), tin (Sn), antimony (Sb), aluminum (Al), germanium (Ge), zinc (Zn), and lead (Pb), or a mixture of two or more of the above components. In addition, the composite particles may include any one selected from an oxide of the above components, or a mixture of two or more of the oxides.

Generally, silicon particles are used as the composite particles. The silicon particles are adapted to have a particle size of 10 to 200 nm by pulverizing particles having a size of several μm (FIG. 1(d)) obtained from waste silicon (FIG. 1(e)).

In the prior arts, during processing with the composite particles, composite of graphite particles and silicon particles are performed by a wet process. In this case, there are problems in that the yield is low, the stability of the prepared particles is insufficient, and the charge/discharge effects are also insufficient. In the present invention, these problems are solved by applying a mechanochemical reaction which is a dry preparation method.

Since the composite particles have a significantly smaller size than the graphite byproduct particles, they react on the surface of the graphite byproduct particles through a mechanochemical reaction to form a bond therewith, and as a result, a surface coating layer is formed. In addition, when the surface of the composite particles is coated, an effect of forming curved graphite byproduct particles having sharp edge portions may be obtained. This is because the coating is performed while nanometer-sized composite particles penetrate into the edge portion.

MSR Advances, 4, 155-162 (2019) discloses experimental results for preparing a composite by performing a mechanochemical reaction on the graphite particles and iron oxide nanoparticles. In this case, this document describes results of carbon atoms being incorporated into a crystal structure of iron oxide nanoparticles or forming a new crystal structure depending on mechanochemical reaction conditions. The above results suggest that a crystal structure unsuitable for the anode active material may be generated depending on the mechanochemical reaction conditions. Therefore, in the present invention, the mechanochemical reaction conditions are optimized and applied to prepare the composite by reflecting the results of the prior studies.

In addition, it was shown that, prior to performing the mechanochemical reaction, when immersing the intermediate stage-spheroidized particles in hexane for 10 to 30 seconds followed by drying the same, and then performing a mechanochemical reaction by mixing the intermediate stage-spheroidized particles whose surface is subjected to surface treatment with hexane and the composite particles, the generation of undesirable crystal structures was inhibited. This is presumed to be because when carbon atoms penetrate into the structure of the composite particles by the mechanochemical reaction, carbon atoms are provided from hexane molecules adsorbed on the surface, such that the graphite particles themselves do not undergo modification.

The surface of the graphite byproduct particles is coated with the composite particles to prepare coated particles (FIG. 1(b)), and the coated particles are spheroidized then the surface is coated with amorphous carbon, such that spherical graphite coated with amorphous carbon is prepared as shown in FIG. 1(c). The spherical graphite coated with the amorphous carbon is used as a material for an anode active material.

Therefore, in the preparation method of the present invention, mesophase particles (the intermediate stage-spheroidized particles) having a size of 3 to 10 μm are formed before the finally produced spherical graphite is spheroidized into particles having a size of 5 to 30 μm. After adding the pulverized composite particles having a size of 10 to 200 nm to the mesophase particles and coating the surface of the mesophase particles with the composite particles by the mechanochemical reaction under a dry condition, a spheroidizing operation is performed.

The spherical graphite particles prepared as described above may be applied as an anode active material. The anode active material may be included in an anode to form a secondary battery. The secondary battery may include the anode, a cathode disposed to face the anode and including a cathode active material, a separator provided between the cathode and the anode, and an electrolyte provided to impregnate the separator.

In order to confirm effects obtained when applying the anode active material of the present invention to a secondary battery, a cathode containing LNMO (LiNi0.5Mn1.5O4) and an anode to which spherical graphite (Si content of 13%) according to the present invention is applied as an anode active material were prepared, then a full cell was prepared using the cathode and anode, followed by measuring the discharge capacity retention characteristics according to the number of charging/discharging times (cycles). In the full cell, Super-P Li and PVDF binder were applied as a conductive agent, and a separation membrane of 15 μm PE separation membrane of which both sides are coated with ceramic of 2 to 3 μm was applied as a separation membrane (separator). As the electrolyte, 1M LiPF6+EC:DEC:DMC (vol % 1:1:1) was used. In addition, for comparison, a test was conducted using conventional spherical graphite deposited with silicon prepared by a dry preparation process as an anode active material.

As a result, as shown in FIG. 2(a), it could be found that when the spherical graphite according to the present invention was applied as the anode active material, higher charge/discharge efficiency was exhibited than the case of using the spherical graphite according to the conventional preparation method. In addition, also from the evaluation results of the cycle characteristics, it could be confirmed that when the spherical graphite according to the present invention was applied as the anode active material, stable capacity retention rate characteristics were exhibited at the time of repeated charging and discharging under the same condition.

It is considered that these characteristics of the secondary battery are caused by improvement in the characteristics of the anode active material, since a stable composite with graphite can be formed when preparing spherical graphite by applying a mechanochemical reaction in the present invention.

Figure 3B:
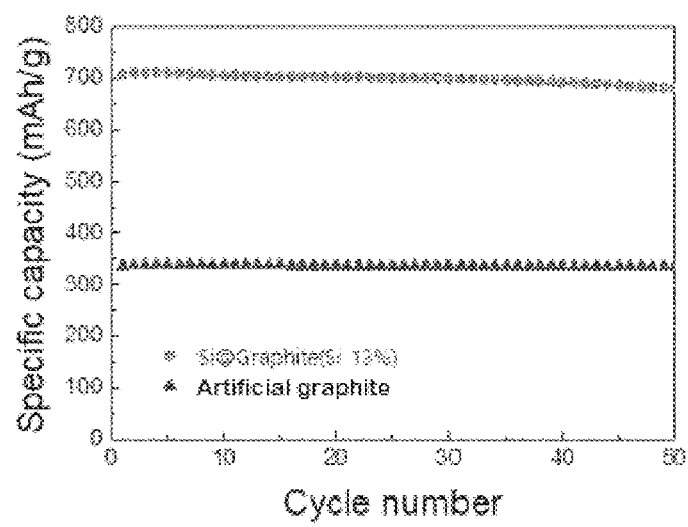

In addition, charge/discharge characteristics and capacity retention rates of the full cell using artificial graphite as the anode active material and the full cell using the spherical graphite of the present invention as the anode active material were evaluated. As a result of the evaluation, as shown in FIGS. 3(a) and 3(b), it was confirmed that improved characteristics of the secondary battery could be obtained when the spherical graphite according to the present invention was applied.

Therefore, it was confirmed that a high-quality secondary battery could be prepared by achieving improvement in electrical conductivity and improvement in output characteristics through the improved electrical conductivity when the spherical graphite according to the present invention was applied as the anode active material.

While the present invention has been described with reference to the preferred embodiments as described above, it is not limited to the above-described embodiments, and various modifications and variations may be made by persons skilled in the art to which the present invention pertains without departing from spirit of the present invention. Such modifications and variations are duly included within the scope of the present invention and the appended claims.

The invention claimed is:

1. A method for preparing an anode active material comprising the steps of:
   obtaining graphite byproduct particles that have not been spheroidized in a step of pulverizing and spheroidizing flaky graphite particles;
   preparing coated particles by mixing the graphite byproduct particles with composite particles and performing a mechanochemical reaction thereon to coat the surface of the graphite byproduct particles with the composite particles; and
   spheroidizing the coated particles and coating the surface thereof with amorphous carbon to prepare spherical graphite.

2. The method for preparing an anode active material according to claim 1,
   wherein the composite particles include any one of silicon (Si), tin (Sn), antimony (Sb), aluminum (Al), germanium (Ge), zinc (Zn), lead (Pb), or a mixture of two or more thereof, or an oxide of the above components, or a mixture of two or more of the oxides.

* * * * *